(12) United States Patent
Cmich et al.

(10) Patent No.: US 9,326,446 B2
(45) Date of Patent: May 3, 2016

(54) CLUTCH ASSEMBLY FOR A LAWN MAINTENANCE VEHICLE

(71) Applicant: MTD Products Inc, Valley City, OH (US)

(72) Inventors: Ryan Cmich, Valley City, OH (US); Axel Schaedler, Valley City, OH (US); Jimmy Eavenson, Sr., Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 14/618,115

(22) Filed: Feb. 10, 2015

(65) Prior Publication Data
US 2015/0257339 A1    Sep. 17, 2015

Related U.S. Application Data

(60) Provisional application No. 61/951,572, filed on Mar. 12, 2014.

(51) Int. Cl.
| F16D 13/76 | (2006.01) |
| F16D 67/00 | (2006.01) |
| F16H 57/10 | (2006.01) |
| A01D 69/08 | (2006.01) |
| F16H 7/08 | (2006.01) |
| F16D 67/02 | (2006.01) |
| F16D 49/00 | (2006.01) |

(52) U.S. Cl.
CPC ............... *A01D 69/08* (2013.01); *F16D 49/00* (2013.01); *F16D 67/02* (2013.01); *F16H 7/0827* (2013.01); *F16H 7/0838* (2013.01); *F16H 2007/0865* (2013.01); *F16H 2007/0893* (2013.01)

(58) Field of Classification Search
CPC ........... A01D 2101/00; A01D 34/6812; A01D 34/6806; F16H 7/0827; F16H 2007/0893
USPC .......................................... 474/119; 192/224.1
See application file for complete search history.

(56) References Cited

U.S. PATENT DOCUMENTS

| 1,160,537 | A | * | 11/1915 | Siddall | ...................... | F16H 9/04 |
| | | | | | | 192/224.1 |
| 1,453,466 | A | * | 5/1923 | Kimble | ..................... | B66B 1/08 |
| | | | | | | 192/224.1 |
| 2,047,840 | A | * | 7/1936 | Twomley | .................. | F16H 9/12 |
| | | | | | | 474/26 |
| 2,414,421 | A | * | 1/1947 | Small | ........................ | B04B 1/20 |
| | | | | | | 210/374 |
| 2,459,373 | A | * | 1/1949 | Gettys | ....................... | F16H 7/14 |
| | | | | | | 192/224.1 |
| 2,466,495 | A | * | 4/1949 | Slemmons | ............ | F16H 7/0827 |
| | | | | | | 192/3.51 |
| 2,488,765 | A | * | 11/1949 | Whitman | .............. | F16H 7/0827 |
| | | | | | | 474/110 |
| 2,957,561 | A | * | 10/1960 | Musgrave | .............. | A01D 69/08 |
| | | | | | | 192/224.1 |
| 2,960,810 | A | * | 11/1960 | Musgrave | .......... | A01D 34/6812 |
| | | | | | | 56/11.3 |

(Continued)

*Primary Examiner* — Henry Liu
(74) *Attorney, Agent, or Firm* — Wegman, Hessler & Vanderburg; Benjamin Cotton; Jason Worgull

(57) ABSTRACT

A clutch assembly attachable to a rotational output shaft of the engine, wherein the clutch assembly is configured to drive at least one implement of a lawn maintenance vehicle is provided. The clutch assembly includes a first pulley fixedly attached to the output shaft, a second pulley independently rotatable relative to the first pulley, and a belt extending between the first and second pulleys and an idler pulley that is movable between an engaged position and a disengaged position. The clutch assembly further includes a third pulley directly connected with the second pulley, wherein rotation of the second pulley is directly transferred to the third pulley, and rotation of the third pulley provides an output rotation of the clutch assembly.

17 Claims, 6 Drawing Sheets

(56) References Cited

U.S. PATENT DOCUMENTS

| | | | | |
|---|---|---|---|---|
| 3,015,237 A | * | 1/1962 | Musgrave | F16H 61/66268 474/33 |
| 3,049,460 A | * | 8/1962 | Garbin | B29D 29/10 156/140 |
| 3,098,778 A | * | 7/1963 | Garner | F16G 5/06 474/252 |
| 3,543,892 A | * | 12/1970 | ***Baillie | A01D 34/6812 192/224.1 |
| 3,570,637 A | * | 3/1971 | Pitman | A01D 34/6812 188/259 |
| 3,930,620 A | * | 1/1976 | Taitel | B65H 19/2223 242/527.3 |
| 3,943,785 A | * | 3/1976 | Percifield | A01D 34/6806 474/171 |
| 3,965,768 A | * | 6/1976 | Foster | F16H 7/1281 474/135 |
| 4,018,096 A | * | 4/1977 | Foster | F16H 7/1281 474/135 |
| 4,036,070 A | * | 7/1977 | Knight | F16H 7/0827 474/119 |
| 4,117,651 A | | 10/1978 | Martin, Jr. | |
| 4,195,466 A | * | 4/1980 | Heismann | A01D 34/6812 56/10.5 |
| 4,216,679 A | * | 8/1980 | Howerton | F16G 5/00 474/139 |
| 4,223,771 A | * | 9/1980 | Petersen | F16D 67/02 192/224 |
| 4,381,165 A | * | 4/1983 | James | F16H 7/0827 192/109 D |
| 4,408,683 A | * | 10/1983 | Elmy | B60K 41/24 192/219.6 |
| 4,409,779 A | * | 10/1983 | Bent | A01D 34/6812 192/224.1 |
| 4,454,706 A | * | 6/1984 | Geeck, III | A01D 34/6806 192/224.2 |
| 4,485,913 A | * | 12/1984 | Treiber | B65G 13/07 198/790 |
| 4,557,710 A | * | 12/1985 | Greider | A01D 34/69 474/118 |
| 4,582,504 A | * | 4/1986 | Schlapman | A01D 34/6812 474/119 |
| 4,738,651 A | * | 4/1988 | Favache | F16H 13/14 474/19 |
| 4,773,895 A | * | 9/1988 | Takami | F16G 5/20 474/238 |
| 4,867,244 A | * | 9/1989 | Cozine | A01B 45/023 172/22 |
| 4,926,947 A | * | 5/1990 | Cozine | A01B 45/023 172/22 |
| 4,997,074 A | | 3/1991 | Larson et al. | |
| 5,526,635 A | * | 6/1996 | Wilder, Jr. | A01D 34/6812 56/11.3 |
| 5,797,251 A | * | 8/1998 | Busboom | A01D 34/6812 192/224.1 |
| 6,592,478 B2 | * | 7/2003 | Wians | F16H 7/0827 474/38 |
| 7,029,408 B2 | * | 4/2006 | Wians | F16H 7/0827 474/17 |
| 2004/0168757 A1 | * | 9/2004 | Vogt | F16G 1/14 156/137 |

* cited by examiner

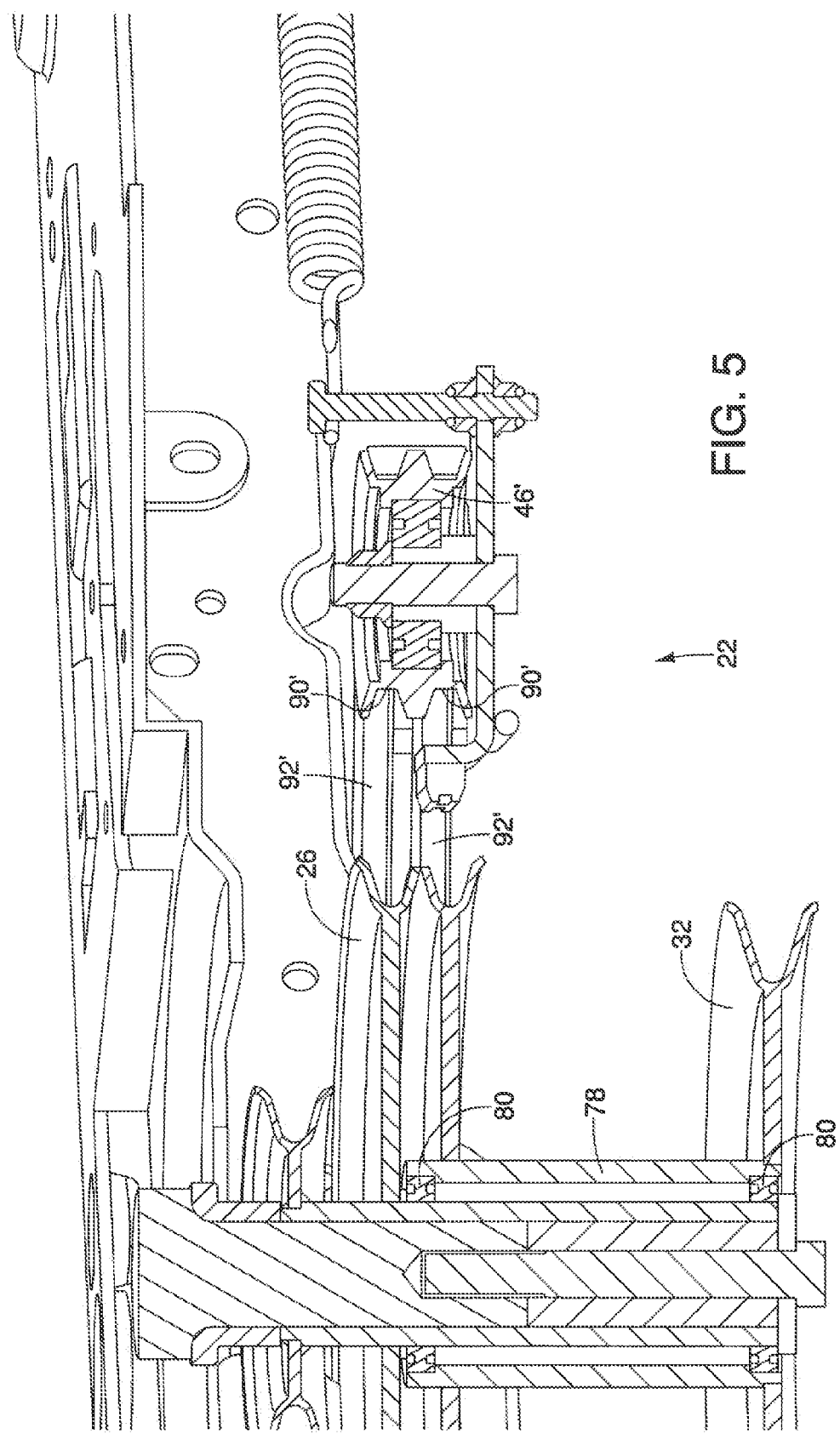

CLUTCH ASSEMBLY FOR A LAWN MAINTENANCE VEHICLE

FIELD OF THE INVENTION

The present invention is directed to a clutch assembly, and more particularly, to a clutch assembly for a lawn maintenance vehicle.

BACKGROUND OF THE INVENTION

Lawn maintenance vehicles such as riding lawn mowers or lawn tractors typically use a clutch to transfer rotational power from the power take-off (otherwise known as the "PTO"), which is a rotatable drive shaft that extends from the engine. There are numerous designs and configurations for drive system clutching and braking mechanisms for use with lawn maintenance vehicles which may include friction-types with consumable media and non-contact-types utilizing fluids or eddy current or magnetics.

One clutching configuration is a belt clutch mechanism in which power is transmitted from the PTO to an implement with rotatable blade(s) or other devices with rotational inputs via a set of belts that are slack for de-coupling (de-clutching) from the PTO. The configuration also provides for tightening or tensioning the set of belts for coupling (or engaging) implements or other devices by way of pulleys that are then rotatably driven by the PTO and corresponding belts. Belt-type clutching mechanisms do not tolerate mis-alignment well, wherein engagement smoothness is largely dependent on instantaneous friction coefficients and component geometry. Disengagement or de-clutching generally requires a secondary mechanism to eliminate belt-pulley drag.

Another clutching configuration is a dog clutch mechanism which provides positive, non-slip engagement between components. Dog clutch mechanisms are typically used where slipping between components is not acceptable. Partial engagement of components under any significant load tends to be destructive.

A further clutching configuration is a hydraulic clutch mechanism wherein the driving and driven members are not in physical contact. Coupling is hydrodynamic and varies with the fluid properties and temperature. These clutches tend to be more expensive and physically larger than belt and dog clutches.

Yet another clutching configuration is an electromagnetic clutch mechanism in which a clutch is engaged by an electromagnet that is an integral part of the clutch assembly. Magnetic particle clutches have magnetically influenced particles contained in a chamber between driving and driven members which, upon application of direct current, causes the particles to clump together and adhere to the operating surfaces. Engagement and slippage are notably smooth. These clutches are more expensive and physically larger than other clutches, and typically require a secondary power source for engagement and de-clutching. Rate of engagement is rapid which imparts shock loads into the PTO system. These loads reduce the life of the drive system.

BRIEF SUMMARY OF THE INVENTION

A need therefore exists for a simple clutching/de-clutching mechanism between a powered drive and a driven implement.

In one aspect of the present invention, a clutch assembly for selectively powering at least one implement of a lawn maintenance vehicle is provided. The lawn maintenance vehicle includes a frame and a power source for generating a rotational output by way of a drive shaft. The clutch assembly includes a first pulley fixedly attached to the drive shaft extending from the power source. The clutch assembly also includes a second pulley fixedly attached to a tube, wherein the second pulley is independently rotatable relative to the first pulley, and the second pulley is rotatable about the drive shaft. A third pulley is fixedly connected to the tube and operatively connected to the at least one implement, wherein rotation of the second pulley causes the third pulley to provide a rotational output. The clutch assembly further includes an actuator assembly which includes an idler pulley that is movable between an engaged position and a disengaged position. A belt is extendable between the first and second pulleys and the idler pulley. The belt engages the first and second pulleys and the idler pulley for directly transferring rotation of the first pulley to the second pulley when the idler pulley is in the engaged position, and the belt disengaging the first and second pulleys and the idler pulley when the idler pulley is in the disengaged position.

In another aspect of the present invention, a clutch assembly for selectively powering at least one implement of a lawn maintenance vehicle is provided. The lawn maintenance vehicle includes a frame and a power source for generating a rotational output by way of a drive shaft. The clutch assembly includes a first pulley fixedly attached to the drive shaft extending from the power source. A second pulley is fixedly attached to a tube that is rotatable about the drive shaft, and the second pulley is independently rotatable relative to the first pulley. A third pulley is fixedly connected to the tube and operatively connected to the at least one implement for driving the at least one implement. At least one belt is operatively connected to the first pulley and the second pulley for transferring rotation of the first pulley to the second pulley. The clutch assembly further includes an actuator assembly that is selectively switchable between a first operative position which causes the at least one belt to engage both the first and second pulleys for transferring rotation from the first pulley to the second pulley and a second operative position which causes the at least one belt to disengage from the first and second pulleys in which rotation from the first pulley is not transferred to the second pulley. Rotation of the first pulley is directly or indirectly transferrable to the second pulley when the actuator assembly is in the first operative position.

In yet another aspect of the present invention, a clutch assembly for selectively powering at least one implement of a lawn maintenance vehicle is provided. The lawn maintenance vehicle includes a frame and a power source for generating a rotational output by way of a drive shaft. The clutch assembly includes a first pulley fixedly attached to the drive shaft extending from the power source. A second pulley is fixedly attached to a tube that is rotatable about the drive shaft, wherein the second pulley is independently rotatable relative to the first pulley. The clutch assembly also includes a third pulley that is fixedly connected to the tube and operatively connected to the at least one implement, wherein rotation of the third pulley drives the at least one implement. An actuator assembly of the clutch assembly has an arm rotatably attached to the frame. The arm has an idler pulley attached thereto, wherein the arm is rotatable to move the idler pulley between an engaged position and a disengaged position. The actuator assembly further has an actuator that is selectively switchable between a first operative position and a second operative position for causing the idler pulley to move between the engaged position and the disengaged position. The clutch assembly further includes at least one of: (a) a single belt selectively engageable with the first and second pulleys and the idler pulley for directly transferring rotation of the first pulley to the second pulley, wherein the single belt transfers rotation of the first pulley to the second pulley when the idler pulley is in the engaged position; or (b) a plurality of belts selectively engageable with the first and second pulleys and the idler pulley for indirectly transferring rotation of the first pulley to the second pulley, wherein the plurality of belts transfer rotation of the first pulley to the second pulley by way of the idler pulley when the idler pulley is in the engaged position.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 5 is a cross-sectional view of another embodiment of a clutch assembly.

Figure 1A:
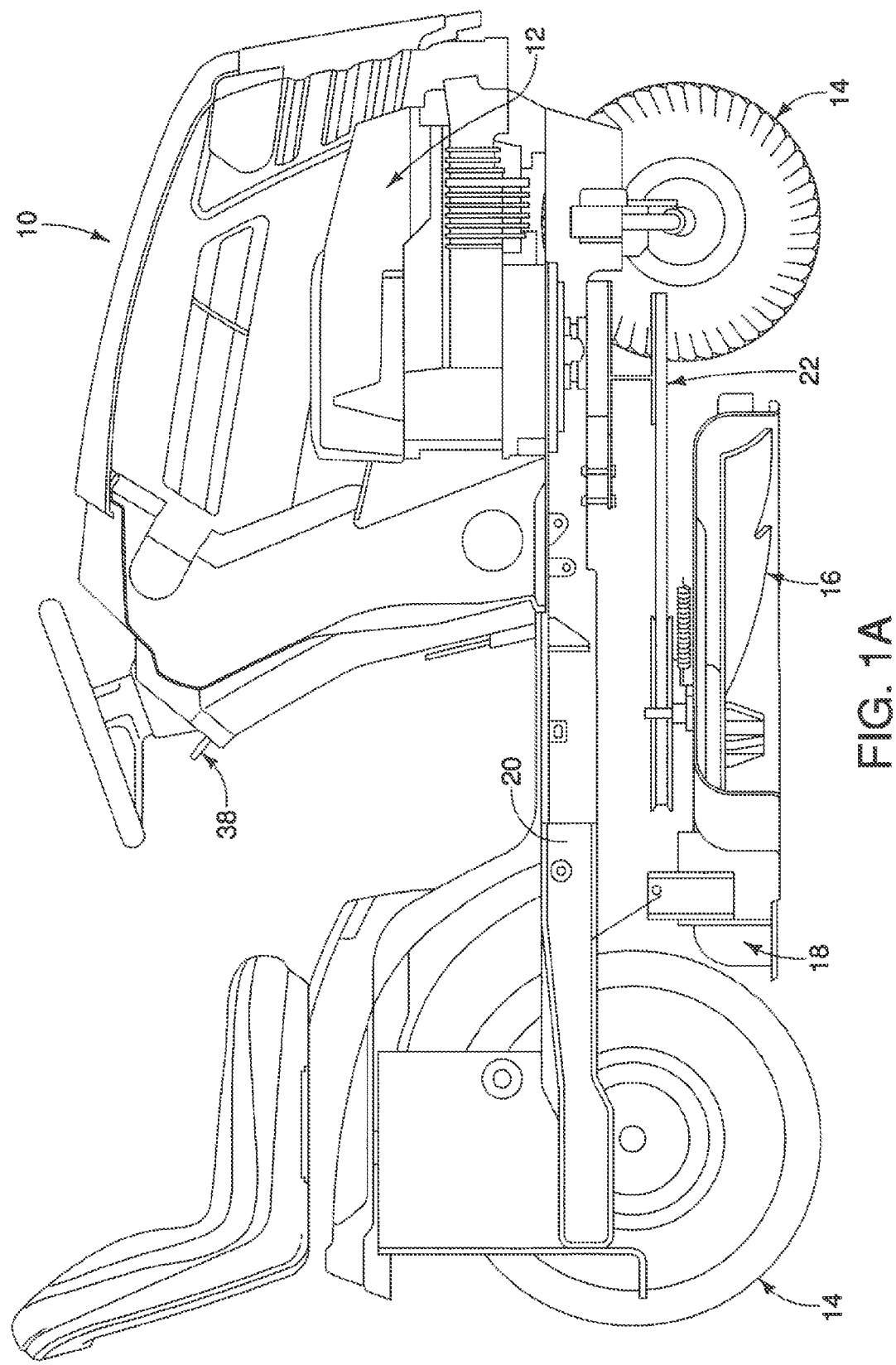
FIG. 1A is a plan view of a lawn maintenance vehicle having a clutch assembly.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 1B:
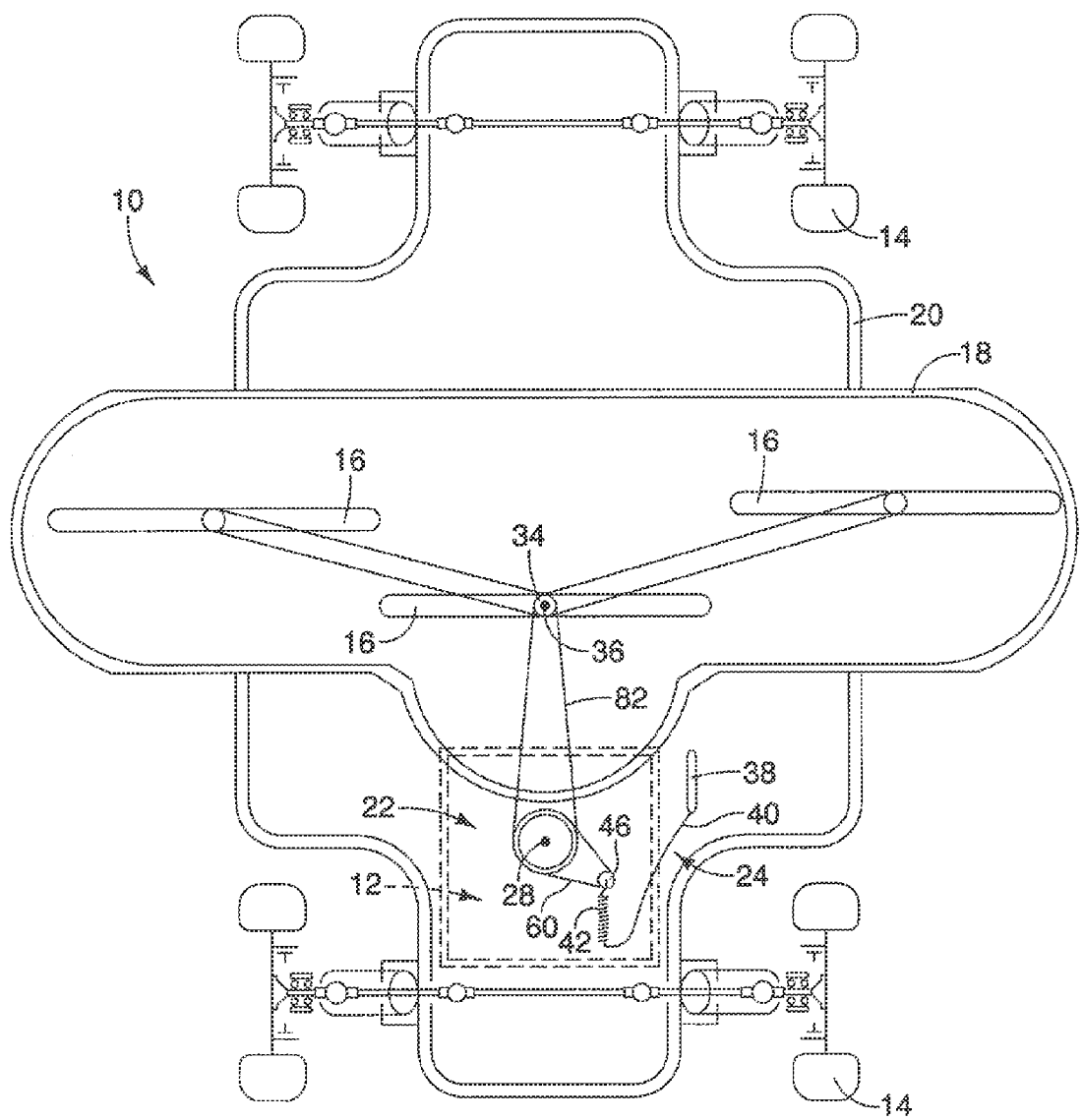
FIG. 1B is a bottom view of an exemplary clutch assembly arrangement on a lawn maintenance vehicle.

Referring to FIGS. 1A-1B, an exemplary embodiment of a lawn maintenance vehicle 10 is shown. The illustrated lawn maintenance vehicle 10 is a riding lawn mower, but it should be understood by one of ordinary skill in the art that the vehicle can be a garden tractor, stand-on mower, or any other vehicle for use in lawn maintenance. The exemplary vehicle 10 includes power source 12, such as an internal combustion engine, an electric motor, a hybrid/electric engine, or the like, configured to power a transmission (not shown) that drives at least a set of the wheels 14 as well as the cutting implements 16 positioned within the cutting deck 18. The wheels 14 and cutting deck 18 are operatively connected to the frame 20. The cutting implements 16 are powered by the rotational output of the power source 12, wherein the cutting implements 16 are selectively driven by the engagement/disengagement of a clutch assembly 22, as will be described below. It should be understood by one of ordinary skill in the art that other implements may also be selectively powered by the power source 12 by way of the clutch assembly 22, but the cutting implements 16 will be described below as the exemplary driven implement(s).

In an exemplary embodiment, as shown in FIGS. 1A-5, the clutch assembly 22 includes an actuator assembly 24 that is operable or actuatable by an operator of the lawn maintenance vehicle 10 during normal operation. The clutch assembly 22 further includes a first pulley 26 driven by a drive shaft 28 from the power source 12, a second pulley 30 independently rotatable relative to the first pulley 26, and a third pulley 32. The clutch assembly 22 is operatively connected to a fourth pulley 34 that is operatively connected to a driven shaft 36, wherein the fourth pulley 34 and driven shaft 36 are driven by the power source 12 upon engagement of the clutch assembly 22. The fourth pulley 34 may include at least one cutting implement 16 attached thereto, and/or the fourth pulley 34 may be operatively connected to additional spaced-apart pulleys (not shown) for rotatably driving other cutting implements 16. The pulleys referred to herein are all full pulleys—as opposed to a half-pulley (upper or lower)—in which the pulley has an outer radial, generally V-shaped groove for receiving a V-shaped belt therein or an outer radial, generally V-shaped projection that is received within corresponding groove in a reverse V-shaped belt. Exemplary embodiments of the different (full) pulleys are shown in the figures.

The actuator assembly 24, which is part of a clutch assembly 22, includes an actuator 38, a guide wire 40, a spring 42, a rotatable arm 44, and an idler pulley 46, as shown in FIGS. 1A-5. The actuator assembly 24 is selectively switchable by an operator between a first operative position and a second operative position, wherein the clutch assembly 22 is in a disengaged condition when the actuator assembly 24 is in the first operative position and the clutch assembly 22 is in an engaged condition when the actuator assembly 24 is in the second operative position. For mechanical actuator assemblies 24, the actuator assembly 24 includes a moveable member that provides the operator with visually distinctive first and second operative positions that causes the idler pulley 46 to move, thereby switching the engaged/disengaged condition of the clutch assembly 22 in response to movement of the moveable member; however, for electrical actuator assemblies 24, the actuator assembly 24 may include something as simple as a depressible button in which a first depression of the button would cause the idler pulley 46 to move which causes the clutch assembly 22 to be switched to the engaged condition and a second depression of the same button would cause the idler pulley 46 to move which causes the clutch assembly 22 to be switched to the disengaged position. These electrical actuator assemblies 24 may include at least one mechanically movable member located downstream of the user interface or user-operatable control that is movable between a first position and a second position for switching the clutch assembly 22 between the engaged and disengaged conditions.

In an embodiment, the actuator 38 is formed as a lever, but it should be understood by one of ordinary skill in the art that the actuator 38 can also be a pushable button, a toggle switch, a translatable knob, or any other mechanical or electrical device or mechanism that is easily reachable by the operator while driving or operating the lawn maintenance vehicle 10 for switching the clutch assembly 22 between an engaged condition and a disengaged condition. In an embodiment, the actuator 38 is a lever that is positioned adjacent to the seat for a riding mower, for example, to allow the operator to simply reach down and pull on the lever to engage the clutch assembly 22 and push on the lever to disengage the clutch assembly.

In another embodiment, the actuator 38 is a button located on a dashboard or something similar for displaying gauges, wherein the button is depressible for switching the clutch assembly 22 between the engaged and disengaged conditions.

In the exemplary embodiment shown in FIGS. 1B-5, the guide wire 40 extends between the actuator 38 and the spring 42, wherein one end of the guide wire 40 is attached to the actuator 38 and the other end of the wire is attached to the spring 42. The guide wire 40 is a retractable wire positioned within a sheath, wherein the ends of the wire extend beyond the sheath to allow for the movement of the wire 40 within the sheath. The guide wire 40 is configured to transfer the relative movement of the actuator 38 to the spring 42 or generate movement of the spring 42 in response to an electric signal created by engagement/disengagement of the actuator 38. For example, when the actuator 38 is moved to engage the clutch, the end of the guide wire 40 attached to the actuator 38 is extracted from the sheath and the end of the spring 42 to which the opposing end of the guide wire 40 is attached is pulled; in a like manner, when the actuator 38 is moved to disengage the clutch assembly 22, the end of the guide wire 40 attached to the actuator 38 is retracted into the sheath such that the end of the spring 42 to which the guide wire 40 is attached releases the tension in the spring 42. In another embodiment, the actuator 38 is operatively connected to the spring 42 by way of a linkage connection (not shown) such that movement of the actuator 38 is transferred directly through the linkage(s) to the end of the spring 42. In yet another embodiment, the actuator 38 is electrically connected to a solenoid which operates a plunger (not shown) that is extended or retracted in response to the activation of the actuator 38, and the plunger is attached to the end of the spring 42 to cause the spring 42 to be pulled into tension or relaxed.

The spring 42, as shown in FIGS. 1A-5, is a coil spring having a first end and a second end. The guide wire 40 is attached to the first end of the spring 42, and the second end of the spring 42 is attached to a pin 48 that is attached to the rotatable arm 44. The spring 42 is positioned between the guide wire 40 and the pin 48 to bias the idler pulley 46 away from the first and second pulleys 26, 30 and into an engaged position. The spring 42 is also configured to provide a smooth transition between the engaged and disengaged conditions. Although the exemplary embodiment of the clutch assembly 22 illustrates the spring 42 being positioned between the guide wire 40 and the pin 48 of the rotatable arm 44, it should be understood by one of ordinary skill in the art that the guide wire 40 may be connected directly to the rotatable arm 44, wherein the arm 44 is biased into a disengaged position. In an embodiment, the arm 44 is biased toward the disengaged position when the actuator 38 and idler pulley 46 are in disengaged positions. This can be accomplished by a spring attachable to the arm 44 for providing a biasing force for biasing the idler pulley 46 toward the disengaged position. This can also be accomplished by the belt 60 which would otherwise pull the idler pulley toward the disengaged position when the tightening force from the spring 42 is released. In another embodiment, there are no external forces exerted onto the arm 44 when the clutch assembly 22 is disengaged from the power source 12.

Figure 2:
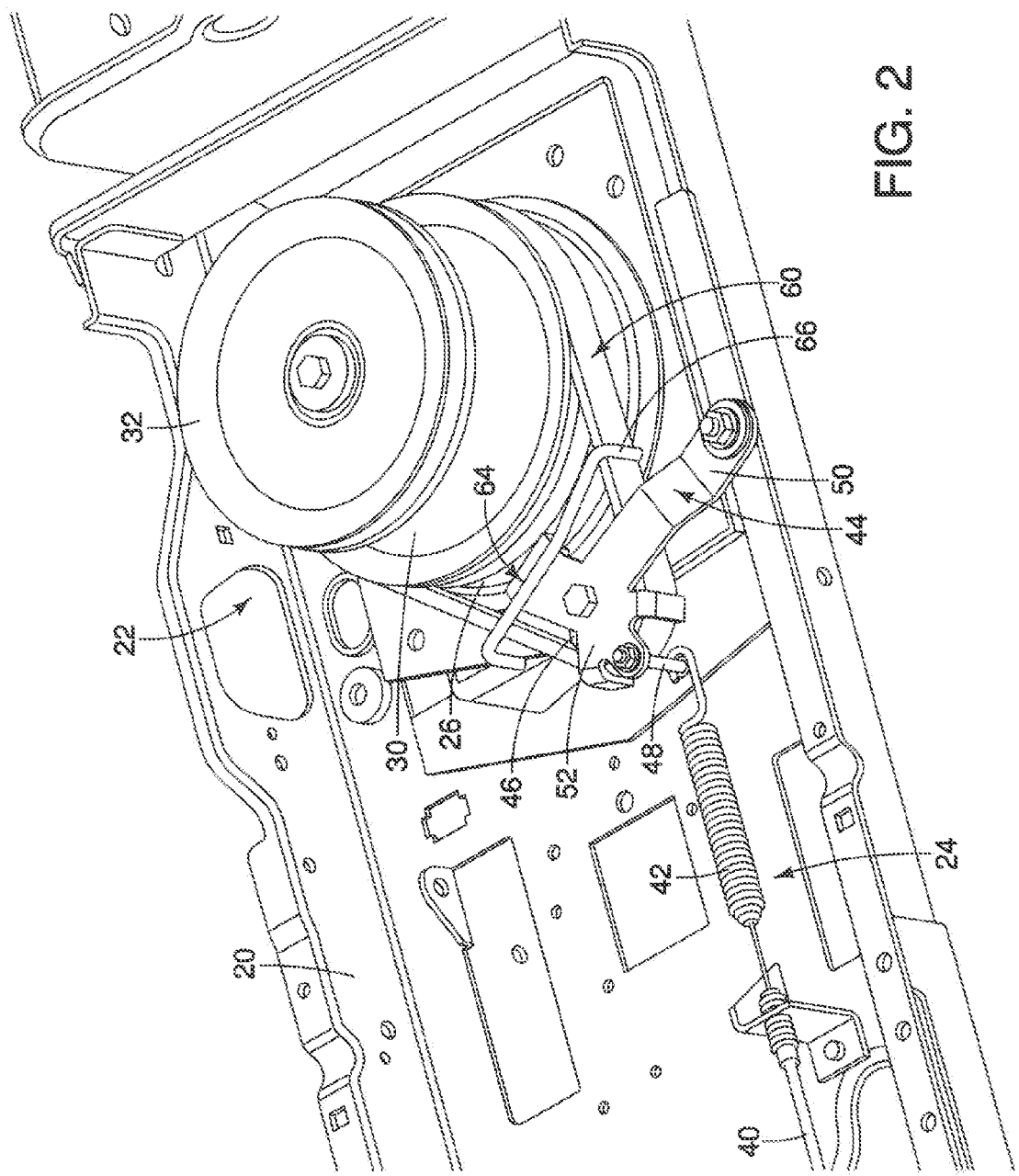
FIG. 2 is a bottom perspective view of an exemplary embodiment of a clutch assembly.
Figure 3:
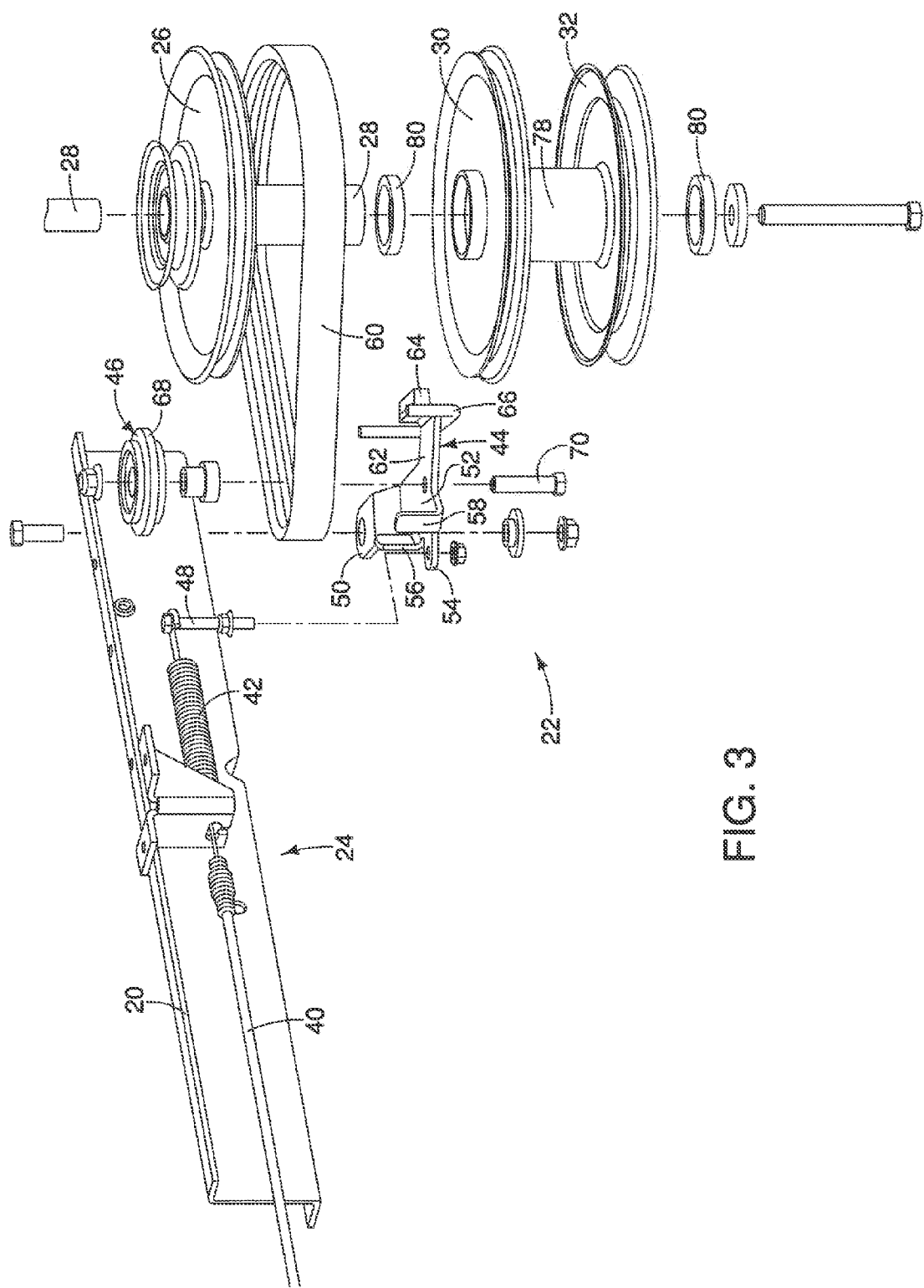
FIG. 3 is an exploded view of the clutch assembly shown in FIG. 2.

The rotatable arm 44, as shown in FIGS. 1A-5, is operatively connected to the frame 20, wherein the arm 44 is rotatable about the end operatively connected to the frame 20. As shown in FIGS. 2-3, the arm 44 is an elongated member having a first end 50 rotatably and operatively secured to the frame and a second end 52 operatively connected to the idler pulley 46 such that rotational movement of the arm 44 about the first end 50 causes the idler pulley 46 to travel along an arcuate path toward/away from the first and second pulleys 26, 30. The second end 52 of the arm 44 includes a first protrusion 54 that extends laterally. The pin 48 to which the spring 42 is attached is operatively connected to the first protrusion 54. The pin 48 has a first end attached to the first protrusion 54, and the spring 42 is attached to the second end of the pin 48. The pin 48 allows the spring 42 to be attached in a spaced-apart manner from the arm 44, but it should be understood by one of ordinary skill in the art that the spring 42 may also be attached directly to the arm 44 or the first protrusion 54 of the arm 44. It should be understood by one of ordinary skill in the art that the second end 52 of the rotatable arm 44 may also be formed as a single wide member instead of separate protrusions and portions that extend therefrom; however, the protrusions explained herein allow the arm 44 to be easily stamped such that these protrusions and members extending from the second end 52 all form a single integral member. Alternatively, each of the protrusions and portions extending from the second end 52 of the arm 44 may also be formed separately and subsequently fixedly attached to the second end 52.

As shown in FIGS. 2-3, the second end 52 of the arm 44 further includes a second protrusion 56 and a third protrusion 58 extending therefrom. The second and third protrusions 56, 58 are curved such that the second and third protrusions 56, 58 extend substantially perpendicular to the plane of the second end 52. The second and third protrusions 56, 58 are bent such that they extend and are positioned adjacent to the outer radial edge of the idler pulley 46, and the first belt 60 is positionable between the idler pulley 46 and the second and third protrusions 56, 58. The second and third protrusions 56, 58 are configured to ensure proper positioning of the first belt 60 relative to the idler pulley 46 so as to prevent the first belt 60 from becoming displaced during disengagement of the clutch assembly 22 which would prevent the idler pulley 46 from positively engaging the first belt 60. In particular, when the clutch assembly 22 is in the disengaged condition, the idler pulley 46 is positioned closer to the first and second pulleys 26, 30 which provides slack in the first belt 60. This slack may sometimes be enough such that the first belt 60 may slide or otherwise move relative to the first and second pulleys 26, 30 such that the first belt 60 is no longer alignable therewith when the first belt 60 is tightened by the idler pulley 46.

Figure 4:
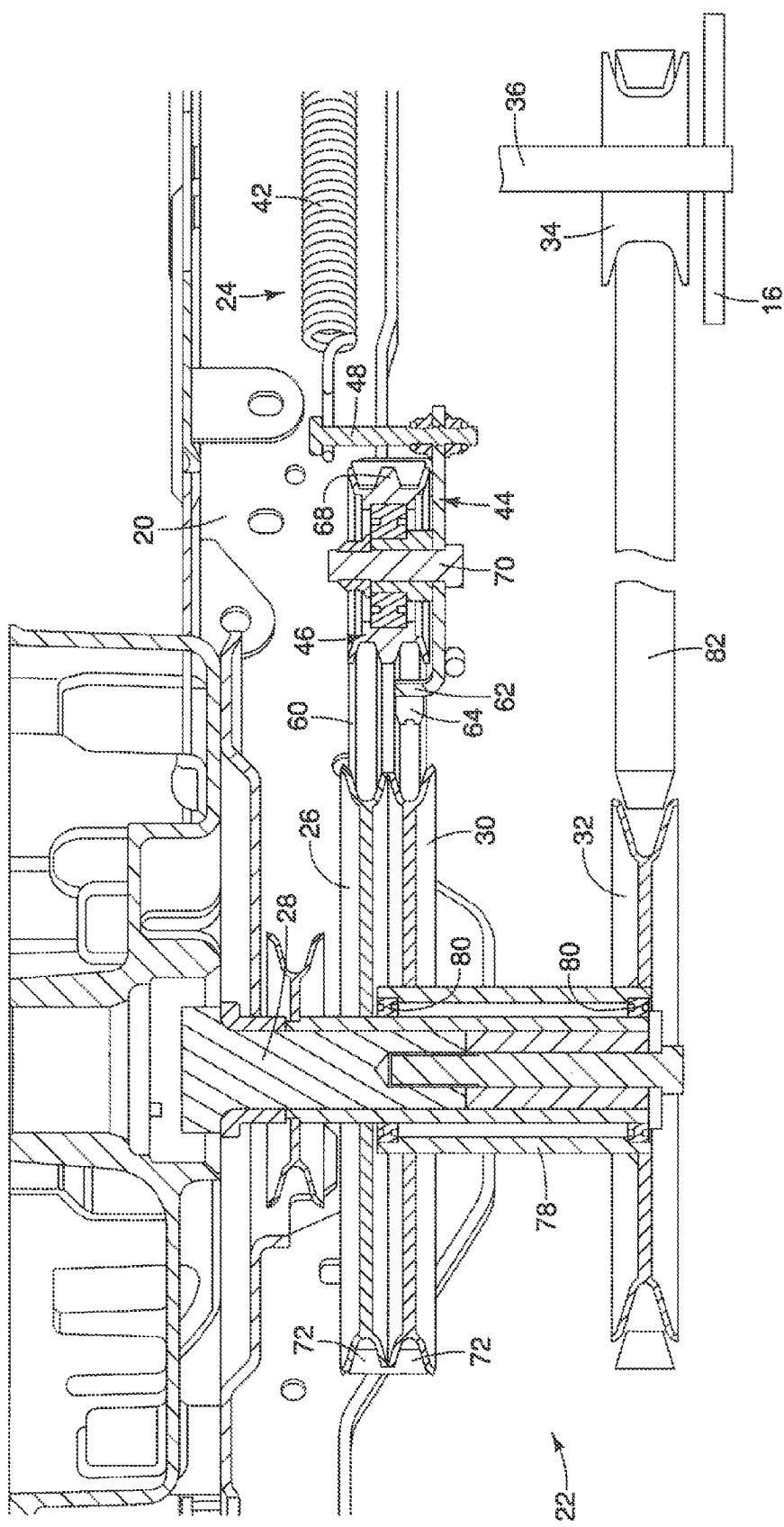
FIG. 4 is a cross-sectional view of the clutch assembly shown in FIG. 2.

As shown in FIG. 2-4, the rotatable arm 44 further includes a fourth protrusion 62 extending from the second end 52 in a direction opposite the first, second, and third protrusions 54, 56, 58. The fourth protrusion 62 includes a first portion that slightly extends in a coplanar manner relative to the second end 52, and the fourth protrusion 62 further includes a curved portion that is curved in the same general manner as the second and third protrusions 56, 58 such that the curved portion of the fourth protrusion 62 is oriented substantially perpendicular to the second end 52. A brake pad 64 is attached to the fourth protrusion 62, wherein the brake pad 64 is configured to contact the second pulleys 30 when the clutch assembly 22 is in the disengaged condition. As such, when the clutch assembly 22 is actuated to the disengaged condition, the idler pulley 46 moves toward the first and second pulleys 26, 30 to create slack in the first belt, and additionally to cause the brake pad 64 to engage the second pulley 30 to prevent rotation of the second pulley 30. In an embodiment, the brake pad 64 is integrally formed with the fourth protrusion 62. In another embodiment, the brake pad 64 is formed separately from the arm 44 and then subsequently attached to the fourth protrusion 62. The brake pad 64 can be formed of any material, but it should be understood by one of ordinary skill in the art that the brake pad 64 should be formed of a wear-resistant material that can withstand selective gripping contact with the second pulley 30. The brake pad 64 is configured to actively stop, or otherwise slows the rotation of second pulley 30 after the clutch assembly 22 is disengaged from the power source 12. Ceasing the rotation of the second pulley 30 effectively causes a similar ceasing of the rotation of the cutting implements 16 and/or other implements operatively driven by the power source 12 via the clutch assembly 22. In an embodiment, the cross-sectional shape of the brake pad 64 is generally V-shaped, or at least has a similar profile to the groove of the second pulley 30 to which the first belt 60 engages. The brake pad 64 can be configured to contact the entire surface of the groove of the second pulley 30 along an arc of the circumference of the pulley or only a portion of the surface of the groove such as the upper half, lower half, or an outer radial edge.

In an embodiment, the rotatable arm 44 further includes a retainer 66 attached thereto, as shown in FIGS. 2-3. The retainer 66 is a substantially U-shaped member that is attached to the fourth protrusion 62, wherein the retainer 66 includes a base and two opposing legs extending from the base in a perpendicular manner. The legs of the retainer 66 are directed away from the fourth protrusion 62 in a generally parallel manner as the second and third protrusions 54, 56 extend from the second end 52. The base of the retainer 66 is fixedly attached to the fourth protrusion 62. The retainer 66 is configured to retain the first belt 60 when the clutch assembly 22 is in the disengaged condition. In particular, when the clutch assembly 22 is in the disengaged position and the rotatable arm 22 is rotated toward the first pulley 26, slack is introduced in the first belt 60. Because the first belt 60 is not engaged with the first and second pulleys 26, 30 when in the disengaged condition, the retainer 66 is configured to prevent the first belt 60 from generating enough slack that the first belt 60 becomes mis-aligned relative to the idler pulley 46. The retainer 66 is positioned below the first belt 60 to prevent the first belt from falling away from the idler pulley 46.

As shown in FIGS. 2-5, the idler pulley 46 of the actuator assembly 24 is a pulley that is rotatably attached to the arm 44 by a pin 70. The idler pulley 46 is movable along an arcuate pathway relative to the connection between the first end 50 of the arm 44 and the frame 20. This arcuate movement of the idler pulley 46 causes the clutch assembly 22 to be selectively switchable between an engaged condition and a disengaged condition. The idler pulley 46 is unlike most conventional pulleys that have a single groove formed in the outer circumferential surface; instead, the idler pulley 46 has a V-shaped projection 68 that extends radially outward to form a projection as the outer circumferential surface, as shown in FIG. 4. The projection 68 of the idler pulley 46 is V-shaped, which corresponds to a groove formed in the first belt 60 which allows the idler pulley 46 to frictionally connect to the first belt 60 when the projection 68 is received in the groove of the first belt 60. It should be understood by one having ordinary skill in the art that the idler pulley 46 may alternatively be formed with either a single- or double-V groove formed into the outer circumferential surface. The idler pulley 46 is rotatable about the pin 70 relative to the arm 44 when the first belt 60 rotates.

The first belt 60 that selectively connects the first and second pulleys 26, 30 via the idler pulley 46 is a dual-V belt, wherein two V-shaped projections 72—separated by a V-shaped groove—extend inwardly such that the V-shaped projections 72 are received within a corresponding groove in each of the first and second pulleys 26, 30, as shown in FIGS. 2-4. Each V-shaped projection 72 includes a pair of opposing surfaces that are formed at an angle to each other to form the V-shape. In an embodiment, the distal end of each projection 72 is a substantially flat surface that connects the angled side surfaces, but the end can also be rounded or any other shape. The first belt 60 is configured to transfer rotational power from the first pulley 26 to the second pulley 30 when the clutch assembly 22 is in the engaged condition, such that a full v-shaped projection 72 engages each of the pulleys. As explained above, prior art clutches typically utilized a single-V belt to transfer rotational power from one pulley to another, wherein both the driving pulley and the driven pulley had only a half-V groove such that each pulley contacted only half (or one surface) of a V-shaped belt. This often leads to inadvertent slippage between the belt and opposing half-groove of the pulleys. The use of a dual-V belt as the first belt 60 is configured to allow both the driving pulley (first pulley 26) and the driven pulley (second pulley 30) to have two distinct surfaces that contact the first belt 60 during engagement, thereby minimizing the potential for slippage between the first belt 60 and the first and second pulleys 26, 30 when the clutch assembly 22 is in the engaged condition.

In the exemplary embodiment illustrated in FIG. 4, rotation of the first pulley 26 is transferred directly to the second pulley 30 by way of the dual-V belt when the clutch assembly 22 is in the engaged condition. The direct transfer of rotation is a result of the second belt 60 being a single belt that simultaneously engages both the first and second pulleys 26, 30, which are independently rotatable relative to each other.

As shown in FIG. 3, the third pulley 32 is fixedly connected to the second pulley 30 by way of a tube 78. The tube 78 directly transfers rotation of the second pulley 30 to the third pulley 32 so that both pulleys rotate simultaneously. In an embodiment, both the second and third pulleys 30, 32 are substantially the same size, which provides for a 1:1 rotational transfer ratio from the second pulley 30 to the third pulley 32. In another embodiment, as illustrated in FIG. 3, the second pulley 30 is larger than the third pulley 32 which provides for a rotational transfer ratio that is greater than 1:1 such that the third pulley 32 rotates faster than the second pulley 30 in response to rotation of the second pulley 30. In yet another embodiment, the second pulley 30 is smaller than the third pulley 32 which provides for a rotational transfer ratio that is less than 1:1 such that the third pulley 32 rotates slower than the second pulley 30 in response to rotation of the second pulley 30. A bearing 80 is positioned between both the second and third pulleys 30, 32 and the drive shaft 28, which allows the second and third pulleys 30, 32 to be operatively connected to the drive shaft 28 while still being independently rotatable relative to the first pulley 26 and the drive shaft 28.

In an embodiment, rotation of the third pulley 32 is transferred to a fourth pulley 34, as shown in FIG. 4, by way of a second belt 82. The second belt 82 is a V-shaped belt that is received in the circumferential groove of both the third pulley 32 and the fourth pulley 34. The third and fourth pulleys 32, 34 are in continuous operative engagement through the second belt 82 such that rotation of either pulley causes similar rotation of the opposing pulley. The fourth pulley 34 is fixedly attached to the driven shaft 36 such that rotation of the third pulley 32 is transferred through the second belt 82 to drive the fourth pulley 34. The fourth pulley 34 is fixedly attached to the driven shaft 36 such that rotation of the fourth pulley 34 causes the driven shaft 36 to rotate. In an embodiment, the fourth pulley 34 is a single pulley, as shown in FIG. 4, wherein the rotation of the fourth pulley 34 and the driven shaft 36 can be transferred directly to a cutting implement 16 attached to the driven shaft 36. Alternatively, the rotation of the fourth pulley 34 and the driven shaft 36 can be transferred to another pulley (not shown) that is connected to separate pulleys, each of the additional pulleys configured to drive a cutting implement 16. In another alternative embodiment, the fourth pulley 34 is a double-pulley in which one of the pulleys receives the second belt 82 and the other pulley is fixedly attached to the fourth pulley 34 and is connected to additional spaced-apart pulleys via a third belt for driving additional cutting implements 16. It should be understood by one having ordinary skill in the art that rotation of the third pulley 32 is configured to drive the cutting implements 16 or other implements attachable to the frame 20 including, but not limited to, a blower, a snow thrower, a powered broom, or any other implement that can be powered by a rotating shaft driven by the third pulley 32 via a belt connection.

The third pulley 32 is configured to transfer rotation from the clutch assembly 22 to at least one implement 16 either directly or indirectly. For example, a cutting implement 16 can be attached to the third pulley such that rotation of the third pulley directly rotates the implement 16. In another example, the third pulley 32 is operatively connected to the implement 16 via a fourth pulley 34 that is spaced-apart from the third pulley 32 and is connected thereto by a belt such that rotation of the third pulley 32 is transferred to the fourth pulley 34 by way of the belt, and it is the rotation of the fourth pulley 34 that drives the implement(s) 16 operatively connected thereto.

In operation, an operator is seated on the lawn maintenance vehicle 10 (or otherwise in an operating position). When the lawn maintenance vehicle 10 is off or prior to actuating the clutch assembly 22, the clutch assembly 22 is in a disengaged condition. In the disengaged condition, the idler pulley 46 is in a disengaged position in which the rotatable arm 44 is rotated and biased toward the first and second pulleys 26, 30 by the spring 42. When the idler pulley 46 is in the disengaged position, the brake pad 64 is either in contact with the second pulley 30 or is positioned immediately adjacent thereto to prevent rotation of the second pulley 30 in response to the start-up of the power source 12 of the lawn maintenance vehicle 10. Further, when the idler pulley 46 is in the disengaged position, there is sufficient slack in the first belt 60 to prevent rotation of the first pulley 26 from being transferred to the second pulley 30. As the power source 12 is started, the first pulley 26 rotates in response, but the disengagement of the clutch assembly 22 prevents the rotation of the first pulley 26 from driving any implements.

To actuate the clutch assembly 22 from the disengaged condition to the engaged condition, the operator activates the actuator 38—for example, by pulling a lever or pushing a button—which tensions the spring 42, thereby causing the rotatable arm 44 to rotate such that the idler pulley 46 is moved to the engaged position, whereby the slack in the first belt 60 is eliminated. Once the slack in the first belt 60 is eliminated as a result of the idler pulley 46 being located in the engaged position, rotation of the first pulley 26 is transferred to the second pulley 30 by way of the first belt 60. Further, rotation of the second pulley 30 is transferred directly to the third pulley 32 by way of the tube 78. Additionally, rotation of the third pulley 32 is transferred to the fourth pulley 34 by way of the second belt 82, and the fourth pulley 34 drives the driven shaft 36 and implements 16 operatively powered by the fourth pulley 34.

In order to stop the operation or rotation of the driven implements, the operator actuates the actuator 38 from the engaged condition to the disengaged condition. As a result, the tension in the spring 42 is reduced, causing the arm 44 to rotate and position the idler pulley 46 into the disengaged position which results in slack in the first belt 60 and the brake pad 64 contact the second pulley 30 to prevent further rotation thereof. Without rotation of the second pulley 30, the driven implements cease to rotate and eventually stop.

In another embodiment, illustrated in FIG. 5, the idler pulley 46' forms a dual pulley having a pair of V-shaped grooves 90', wherein each groove 90' is configured to receive a separate V-shaped belt 92'. The first pulley 26 is operatively connected to the idler pulley 46' by way of a V-shaped belt 92' that is received in the upper groove of the idler pulley 46', and the second pulley 30 is similarly operatively connected to the idler pulley 46' by way of a separate V-shaped belt 92' that is received in the lower groove of the idler pulley 46'. When the idler pulley 46' is moved to the engaged position, the slack in both V-shaped belts 92' is eliminated such that both belts are taught. As such, rotation of the first pulley 26 is indirectly transferred to the second pulley 30. In operation, rotation of the first pulley 26 causes the idler pulley 46' to rotate, and rotation of the idler pulley 46' then causes the second pulley 30 to rotate. Because the dual V-shaped first belt 60 described above with respect to FIG. 3 may be difficult to obtain or may be costly, the embodiment shown in FIG. 5 may provide a cost-effective alternative for us in the clutch assembly 22 for driving the implements of the lawn maintenance vehicle 10.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A clutch assembly for selectively powering at least one implement of a lawn maintenance vehicle, said lawn maintenance vehicle including a frame and a power source for generating a rotational output by way of a drive shaft, said clutch assembly comprising:
   a first pulley fixedly attached to said drive shaft extending from said power source;
   a second pulley fixedly attached to a tube, said second pulley being independently rotatable relative to said first pulley, said second pulley being rotatable about said drive shaft;
   a third pulley fixedly connected to said tube and operatively connected to said at least one implement, wherein rotation of said second pulley causes said third pulley to provide a rotational output;
   an actuator assembly having an idler pulley that is movable between an engaged position and a disengaged position; and
   a belt extendable between said first and second pulleys and said idler pulley;
   wherein said belt engages said first and second pulleys and said idler pulley for directly transferring rotation of said first pulley to said second pulley when said idler pulley is in said engaged position, and said belt disengaging said first and second pulleys and said idler pulley when said idler pulley is in said disengaged position.

2. The clutch assembly of claim 1, wherein said belt is a double-V belt that directly transfers rotation of said first pulley to said second pulley.

3. The clutch assembly of claim 2, wherein said idler pulley includes a single projection that engages a groove located in said double-V belt when said idler pulley is in said engaged position.

4. The clutch assembly of claim 1, wherein said actuator assembly further includes an actuator operatively connected to said idler pulley, wherein said idler pulley is switchable between said engaged position and said disengaged position in response to movement of said actuator between a first position and a second position.

5. The clutch assembly of claim 4, wherein said actuator assembly further includes a guide wire extending between said actuator and one end of a spring, and an opposing end of said spring is attachable to an arm that is rotatably connected to said frame, said idler pulley being rotatably attached to said arm.

6. The clutch assembly of claim 5, wherein said arm includes a brake pad extending therefrom, wherein said brake pad contacts said second pulley for stopping rotation of said second pulley when said idler pulley is moved to said disengaged position.

7. The clutch assembly of claim 5, wherein said actuator is one of a lever, a pushable button, a toggle switch, or a translatable knob.

8. A clutch assembly for selectively powering at least one implement of a lawn maintenance vehicle, said lawn maintenance vehicle including a frame and a power source for generating a rotational output by way of a drive shaft, said clutch assembly comprising:
a first pulley fixedly attached to said drive shaft extending from said power source;
a second pulley fixedly attached to a tube that is rotatable about said drive shaft, said second pulley being independently rotatable relative to said first pulley;
a third pulley fixedly connected to said tube and operatively connected to said at least one implement for driving said at least one implement;
at least one belt operatively connected to said first pulley and said second pulley for transferring rotation of said first pulley to said second pulley; and
an actuator assembly being selectively switchable between a first operative position which causes said at least one belt to engage both said first and second pulleys for transferring rotation from said first pulley to said second pulley and a second operative position which causes said at least one belt to disengage from said first and second pulleys in which rotation from said first pulley is not transferred to said second pulley;
wherein rotation of said first pulley is directly or indirectly transferrable to said second pulley when said actuator assembly is in said first operative position.

9. The clutch assembly of claim 8, wherein said at least one belt is a double-V belt that simultaneously engages both said first and second pulleys for direct transfer of rotation from said first pulley to said second pulley when said actuator assembly is in said first operative position.

10. The clutch assembly of claim 8, wherein said at least one belt includes a first belt and a second belt, wherein said first belt extends between said first pulley and said actuator assembly and said second belt extends between said actuator assembly and said second pulley for indirect transfer of rotation from said first pulley to said second pulley when said actuator assembly is in said first operative position.

11. The clutch assembly of claim 8, wherein said actuator assembly includes an actuator operable by an operator, a guide wire extending between said actuator and one end of a spring, an opposing end of a spring being attachable to an arm rotatably attached to said frame, and an idler pulley rotatably attached to said arm, said idler pulley being selectively engageable with said at least one belt.

12. The clutch assembly of claim 8, wherein said idler pulley includes at least one outer radial V-shaped groove formed therein.

13. The clutch assembly of claim 12, wherein said idler pulley includes a pair of adjacent V-shaped grooves formed therein.

14. The clutch assembly of claim 13, wherein said at least one belt includes two V-shaped belts, wherein a first of said V-shaped belts engages said first pulley and one of said V-shaped grooves of said idler pulley when said actuator assembly is in said first operative position and a second of said V-shaped belts engages said second pulley and the other of said V-shaped grooves of said idler pulley when said actuator assembly is in said first operative position.

15. The clutch assembly of claim 8, wherein said idler pulley includes an outer radial V-shaped projection extending therefrom.

16. A clutch assembly for selectively powering at least one implement of a lawn maintenance vehicle, said lawn maintenance vehicle including a frame and a power source for generating a rotational output by way of a drive shaft, said clutch assembly comprising:
a first pulley fixedly attached to said drive shaft extending from said power source;
a second pulley fixedly attached to a tube that is rotatable about said drive shaft, said second pulley being independently rotatable relative to said first pulley;
a third pulley fixedly connected to said tube and operatively connected to said at least one implement, wherein rotation of said third pulley drives said at least one implement;
an actuator assembly having an arm rotatably attached to said frame, said arm having an idler pulley attached thereto, wherein said arm is rotatable to move said idler pulley between an engaged position and a disengaged position, said actuator assembly further having an actuator that is selectively switchable between a first operative position and a second operative position for causing said idler pulley to move between said engaged position and said disengaged position; and
at least one of:
a) a single belt selectively engageable with said first and second pulleys and said idler pulley for directly transferring rotation of said first pulley to said second pulley, wherein said single belt transfers rotation of said first pulley to said second pulley when said idler pulley is in said engaged position;
b) a plurality of belts selectively engageable with said first and second pulleys and said idler pulley for indirectly transferring rotation of said first pulley to said second pulley, wherein said plurality of belts transfer rotation of said first pulley to said second pulley by way of said idler pulley when said idler pulley is in said engaged position.

17. The clutch assembly of claim 16, wherein said actuator is a lever, pushable button, a toggle switch, or a translatable knob.

* * * * *